United States Patent [19]
Hansen et al.

[11] Patent Number: 5,374,428
[45] Date of Patent: Dec. 20, 1994

[54] SUPPLEMENTATION OF PROTEIN DIETS WITH DI- AND TRIPEPTIDES

[75] Inventors: Jeffrey A. Hansen; Jim L. Nelssen, both of Manhattan, Kans.; Stephen A. Blum, Des Moines, Iowa; Mike D. Tokach, Abilene; Robert L. Goodband, Manhattan, both of Kans.

[73] Assignee: Kansas State University Research Foundation, Manhattan, Kans.

[21] Appl. No.: 35,600

[22] Filed: Mar. 23, 1993

[51] Int. Cl.$^5$ ................................................. A23K 1/17
[52] U.S. Cl. ..................................... 424/438; 424/442
[58] Field of Search ..................... 424/438, 442; 514/2

[56] References Cited

U.S. PATENT DOCUMENTS

| | | | |
|---|---|---|---|
| 5,122,515 | 6/1992 | Smith et al. | 514/19 |
| 5,167,957 | 12/1992 | Webb, Jr. et al. | 514/2 |

OTHER PUBLICATIONS

Rouanet et al.; Ann Nutr Metab. 1990; 34; 175–182.
Grimble et al.; Nutrition Research Reviews (1989) 2, 87–108.
Silk et al.; Br. Jr. Nutr. (1975), 33, 95.
Silk et al.; Ann. Nutr. Metab. 26:337–352 (1982).
Ohkohchi et al.; Journal of Pediatric Gastroenterology and Nutrition; 10:490–496 (1990).
Sopromaitaly; Anno XXII, Marzo 1981; Soproferm centra il problema.
Webb; et al; J. Anim. Sci, 1992; 70:3248–3257.
Webb; Federation Proceedings, vol. 45, No. 8, Jul. 1986, pp. 2268–2271.
Linzell et al.; Br. J. Nutr. (1969), 23, 318, with x plate.

*Primary Examiner*—Thurman K. Page
*Assistant Examiner*—Carlos Azpuru
*Attorney, Agent, or Firm*—Hovey, Williams, Timmons & Collins

[57] ABSTRACT

Improved animal diets for oral administration are provided which include a quantity of non-hydrolyzed, non-digested, naturally occurring protein supplemented with a minor amount of an additive selected from the group consisting of di- and tripeptides including an essential amino acid residue. The diets commonly include at least about 8% by weight of such intact protein, which may be derived from typical plant or animal sources. The preferred additive includes an essential amino acid residue selected from the group consisting of lysine, methionine, threonine, tryptophan, isoleucine and valine. Use of the di- and tripeptide additives of the invention gives increased nitrogen use by the animal, as compared with feeding of the amino acid constituents of the additives.

5 Claims, No Drawings

SUPPLEMENTATION OF PROTEIN DIETS WITH DI- AND TRIPEPTIDES

BACKGROUND OF THE INVENTION

1. Field of the Invention

The present invention is broadly concerned with improved diets for oral administration comprising intact, non-hydrolyzed, non-digested, naturally occurring protein(s) supplemented with a minor amount of an additive selected from the group consisting of di- and tripeptides having at least one essential amino acid residue. More particularly, it is concerned with such diets, and corresponding feeding methods, wherein the presence of di- or tripeptide additive results in greater utilization of amino acid nitrogen by the animal, allowing corresponding reductions in the protein content of the diets.

2. Description of the Prior Art

Presently, most essential amino acids supplied by animal diets are derived from naturally occurring plant or animal proteins. It is known, however, to supplement normal diets with various free amino acids such as lysine from lysine.HCl, DL-methionine, L-tryptophan, L-isoleucine and L-threonine. The theory of such supplementation is that the free amino acids are thought to be absorbed by an animal more readily than more complex peptides and proteins. For example, the addition of lysine.HCl to a ton of swine finishing feed allows the dietary protein content to be reduced from 14% to 12%, by replacing 100 pounds of soybean meal with 97 pounds of corn and 3 pounds of lysine.HCl.

Peptides can be produced by enzymatic digestion of protein with proteinases or peptidases. Typically, the digestive process involves the enzymatic degradation of dietary proteins to free amino acids or peptides of varying chain lengths. Research has been conducted in the past to evaluate the nutritional value of dietary peptide supplements in the form of protein hydrolysate peptides, which are a mixture of many amino acids found in proteins prior to hydrolysis thereof. Such experiments have been carried out in many species, including man and rodents. Additionally, studies have been carried out in many species to evaluate the absorptive potential and mechanism of utilization for amino acids and peptides, including man, rodents, fowl, ruminants, and several aquatic species. These studies involve infusion of peptides into the digestive system of the test species, or in vitro digestive investigations.

SUMMARY OF THE INVENTION

The present invention pertains to new animal diets designed for oral administration (feeding) supplemented with a minor amount of an additive selected from the group consisting of di- and tripeptides having at least one essential amino acid residue (i.e., a residue of methionine, arginine, threonine, tryptophan, histidine, isoleucine, lysine, leucine, valine or phenylalanine). The diets of the invention include a quantity of non-hydrolyzed, non-digested, naturally occurring proteins, such as those typically derived from plant and animal sources. In addition, the di- and tripeptides do not compete for the same transport mechanism as the free amino acid constituents thereof. Accordingly, use of the additives of the invention permits better utilization of nitrogen by the animal, thereby allowing concomitant reduction in more expensive naturally occurring protein sources in the diets.

In more detail, the preferred additive of the invention is a di- or tripeptide containing an essential amino acid residue selected from the group consisting of lysine, methionine, threonine, tryptophan, isoleucine and valine. The additives may be in the free form, or more usually in salt form. Generally, the additive is present in a given diet at a level of from about 0.001–5% by weight, and more preferably from about 0.01–1% by weight.

The protein forming a part of the diets of the invention can be taken from a wide variety of sources, but typically plant protein is present. Such plant protein may be derived from a cereal grain, e.g., corn, soybean, wheat, sorghum, oat and barley. Additionally, the protein can be wholly or partially derived from animal sources such as meat, blood meal or bone meal. The total protein content of the diets is generally at least about 8% by weight, and more preferably from about 12–50% by weight. Of course, the precise protein content utilized, as well as other nutritionally useful ingredients (e.g., soybean oil or whey) depends upon the animal being fed.

The diets hereof may be formulated for a wide variety of animals, e.g., swine, poultry, ruminants and fish. Human diets can also be supplemented using the additives of the invention.

Normally, the diets hereof are fed on an ad libitum basis, but those skilled in the art will recognize that this is not a prerequisite. It is only necessary that a given feed containing non-hydrolyzed, non-digested, naturally occurring protein and be supplemented with a di- or tripeptide as defined above.

DETAILED DESCRIPTION OF THE PREFERRED EMBODIMENTS

The following example describes a swine feeding test using a preferred dipeptide in accordance with the invention, namely L-lysyl-glycine.HCl, in the context of supplementation of an otherwise normal corn-soybean meal swine diet. The dipeptide-supplemented diet is compared with a control, and a diet containing lysine.HCl, and the results of the test demonstrate that the dipeptide-supplemented diet gave more efficient nitrogen utilization. It is to be understood that this example is provided by way of illustration only, and nothing therein is to be taken as an overall limitation upon the scope of the invention.

EXAMPLE

A trial of 180 (21±2 days of age) pigs was used in a growth assay to compare the effects of supplementing the pigs' diet with L-lysine.HCl, 98% (78.5% lysine), and the dipeptide L-lysyl-glycine.HCl (approximately 50% lysine) on starter pig performance and nitrogen utilization. Pigs were blocked (n=5) by initial weight (6.3 kg) and assigned to treatments according to ancestry and sex. Feed and water were available ad libitum for 21 days post-weaning (11.7 kg final weight). The control diets were formulated to include 0.9% and 1.1% lysine respectively, using a corn-soybean meal mixture containing 15% edible grade dried whey. Synthetic lysine.HCl and the dipeptide lysyl-glycine were added to the control diets to form test diets containing 1.0% and 1.1% lysine and lysyl-glycine respectively. The following table sets forth each of the six diets used in this study.

TABLE 1

Composition of Experimental Diets (as-fed)

| Supplement Source: | Corn-Soybean Meal Control Diet | | Lysine.HCl | | Lysyl-glycine | |
|---|---|---|---|---|---|---|
| Item    Lysine, % | .90 | 1.10 | 1.00 | 1.10 | 1.00 | 1.10 |
| Corn | 56.03 | 49.23 | 56.03 | 56.03 | 56.03 | 56.03 |
| Soybean meal, 48% | 19.83 | 26.79 | 19.83 | 19.83 | 19.83 | 19.83 |
| Dried whey | 15.00 | 15.00 | 15.00 | 15.00 | 15.00 | 15.00 |
| Soybean oil | 4.00 | 4.00 | 4.00 | 4.00 | 4.00 | 4.00 |
| Monocalcium phosphate | 1.91 | 1.79 | 1.91 | 1.91 | 1.91 | 1.91 |
| Limestone | .80 | .77 | .80 | .80 | .80 | .80 |
| Salt | .30 | .30 | .30 | .30 | .30 | .30 |
| Premix | | | | | | |
| Vitamins | .25 | .25 | .25 | .25 | .25 | .25 |
| Trace minerals | .15 | .15 | .15 | .15 | .15 | .15 |
| Selenium | .05 | .05 | .05 | .05 | .05 | .05 |
| Apramycin | 1.00 | 1.00 | 1.00 | 1.00 | 1.00 | 1.00 |
| Copper sulfate | .08 | .08 | .08 | .08 | .08 | .08 |
| Supplements | | | | | | |
| Dl-methionine, 99% | .05 | .01 | .05 | .05 | .05 | .05 |
| L-threonine | .04 | — | .04 | .04 | .04 | .04 |
| L-lysine.HCl, 98% | — | — | .13 | .25 | — | — |
| L-lysyl-glycine | — | — | — | — | .20 | .40 |
| Glycine | .20 | — | .20 | .20 | .10 | — |
| Corn starch | .31 | .58 | .18 | .06 | .21 | .11 |
| Total | 100.00 | 100.00 | 100.00 | 100.00 | 100.00 | 100.00 |

Results of growth performance from 0–21 days post-weaning are set forth in Table 2 below. Serum samples were obtained on days 7, 14, and 21 for analysis of urea nitrogen. Data were analyzed as a randomized complete block design and means were separated using Bonferroni pared t-tests. Single df contrasts were used to evaluate differences between the two lysine sources and levels. No differences in daily gain or daily feed intake were observed between treatments. In general, pigs consuming the 1.1% lysine corn-soybean meal control diet had higher urea nitrogen than the pigs consuming the reduced protein diets and those consuming the 1.1% lysine, lysyl-glycine supplemented diet had the lowest urea nitrogen. Pigs consuming the diets containing lysyl-glycine had lower urea nitrogen levels than pigs fed the lysine.HCl diets on day 21. In summary, differences in growth were not observed between the dietary lysine sources or levels; however, amino acids appeared to be more efficiently utilized when supplied from the dipeptide lysyl-glycine rather than lysine.HCl, as evidenced by the lower serum urea nitrogen levels on day 21.

TABLE 2

| | Corn-Soybean Control Diets | | Lysine HCl | | Lysyl-glycine | | |
|---|---|---|---|---|---|---|---|
| Lysine, %: | .9 | 1.1 | 1.0 | 1.1 | 1.0 | 1.1 | SE |
| Daily gain, g | 248 | 270 | 276 | 253 | 218 | 280 | 16 |
| Daily feed, g | 417 | 418 | 460 | 413 | 395 | 432 | 18 |
| Gain/feed | 593$^{yz}$ | 646$^{y}$ | 600$^{yz}$ | 613$^{yz}$ | 547$^{z}$ | 643$^{y}$ | 16 |
| d 7 urea N, mg/dl | 11.0$^{yz}$ | 14.0$^{y}$ | 9.5$^{z}$ | 9.2$^{z}$ | 9.7$^{z}$ | 8.5$^{z}$ | .7 |
| d 14 urea N, mg/dl | 12.5$^{y}$ | 13.6$^{y}$ | 9.6$^{z}$ | 8.4$^{z}$ | 8.9$^{z}$ | 8.6$^{z}$ | .6 |
| d 21 urea N, mg/dl$^{a}$ | 12.3$^{x}$ | 13.0$^{x}$ | 10.7$^{xy}$ | 8.5$^{yz}$ | 9.1$^{yz}$ | 7.9$^{z}$ | .5 |

$^{a}$Contrast of lysine.HCl vs. lysyl-glycine (P = 0.05)
$^{xyz}$means within a row lacking a common superscript letter differ (P < 0.05)

We claim:

1. A diet for oral administration to an animal selected from the group consisting of swine, poultry and fish, said diet comprising from about 12–50% by weight non-hydrolyzed, non-digested, naturally occurring protein supplemented with from about 0.001–5% by weight of an additive selected from the group consisting of di- and tripeptides utilizable by said animal and having an essential amino acid residue selected from the group consisting of lysine, methionine, threonine, tryptophan, isoleucine and valine.

2. The diet of claim 1, said additive level being from about 0.01–1% by weight.

3. The diet of claim 1, at least a portion of said protein being derived from a plant source.

4. The diet of claim 3, said plant source being a cereal grain.

5. The diet of claim 4, said cereal grain being selected from the group consisting of corn, soybean, wheat, sorghum, oat and barley.

* * * * *

UNITED STATES PATENT AND TRADEMARK OFFICE
CERTIFICATE OF CORRECTION

PATENT NO. : 5,374,428

DATED : December 20, 1994

INVENTOR(S) : Jeffrey A. Hansen et al

It is certified that error appears in the above-identified patent and that said Letters Patent is hereby corrected as shown below:

On the title page, item [73], following "Assignee: Kansas State University Research Foundation, Manhattan Kansas", there should be added:

-- Lonza, Inc., Fairlawn, New Jersey --.

Signed and Sealed this

Thirtieth Day of May, 1995

*Attest:*

BRUCE LEHMAN

*Attesting Officer*  *Commissioner of Patents and Trademarks*